Patented Dec. 12, 1922.

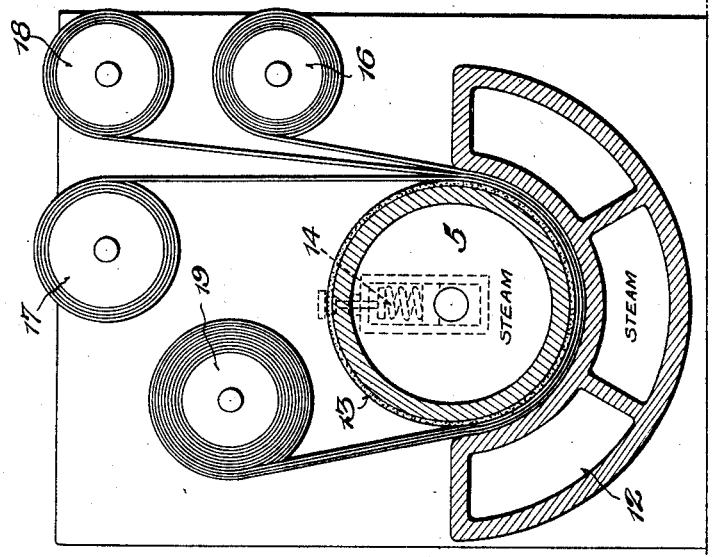

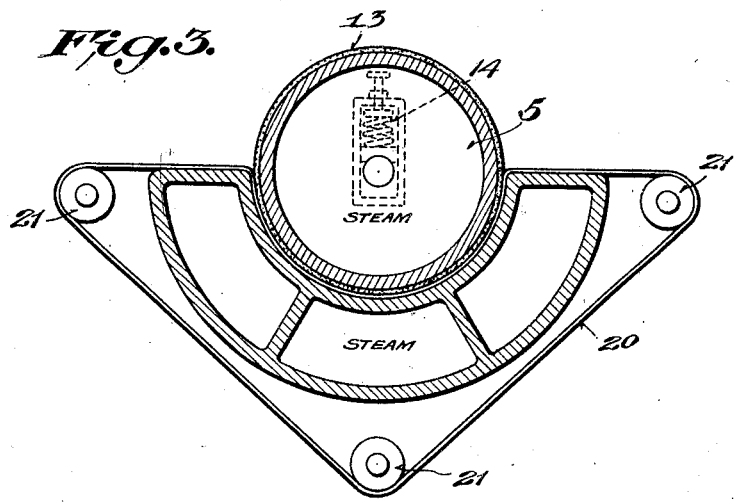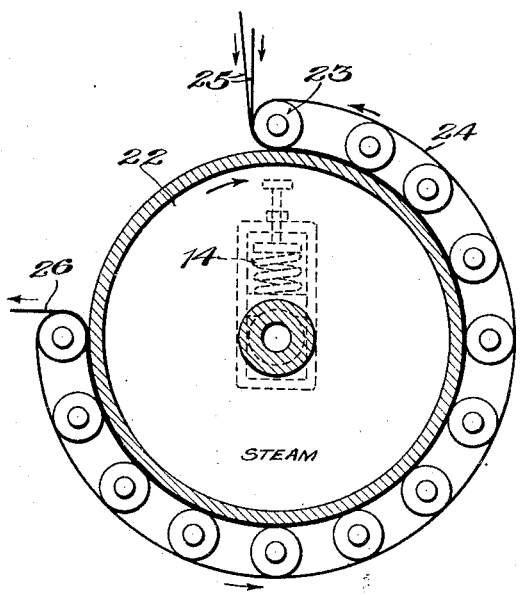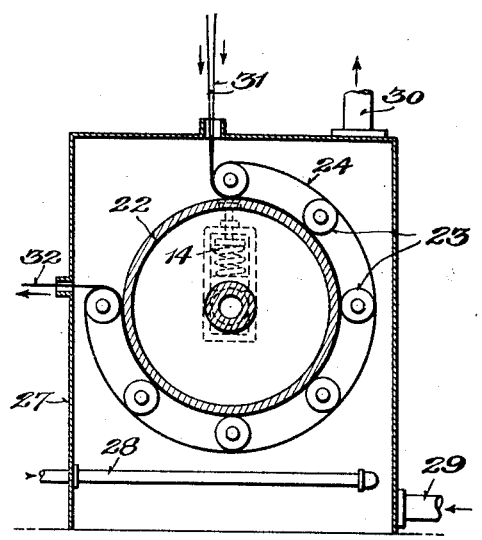

1,438,429

UNITED STATES PATENT OFFICE.

ARMIN ELMENDORF, OF MADISON, WISCONSIN.

PROCESS OF MANUFACTURING PLURAL-LAYER STRUCTURES.

Application filed February 20, 1920. Serial No. 360,220.

*To all whom it may concern:*

Be it known that I, ARMIN ELMENDORF, a citizen of the United States of America, residing at Madison, in the county of Dane and State of Wisconsin, have invented certain new and useful Improvements in Processes of Manufacturing Plural-Layer Structures, of which the following is a specification.

My invention relates to the manufacture of plural layer structures by joining layers of fabric, paper, rubber, leather or similar materials to thin plies of veneer. My process is also applicable to the joining of layers of any two or more of these materials. Cardboard, fibreboard, or other similar materials may have plies of veneer or layers of the other materials mentioned applied thereto by my process.

In carrying out my invention I use albumin glue or other glues requiring heat for setting. The glue may be applied wet by brush or roller or in dry form by using glue-impregnated sheets. The setting of the glue is accomplished by heated rollers in connection with concave plates of such size that heat and pressure may be applied the required length of time to produce a superior grade of plural layer structures. The necessary heat may also be applied by heating the air in the chamber where the pressure is applied.

The rapid, efficient, and economical production of very thin plural layer structures is accomplished by my process. I obviate the necessity of using a large number of clamps and also save the time incident to clamping and unclamping the material. I also save the time usually allowed for setting the glue when heat and pressure are applied in the usual way with plate presses.

By my process a very thin structure may be produced suitable for covering the walls and ceilings of rooms, covering containers, and for general use in decorating.

A further object of my invention is the production of plural layer structures by setting the glue used by a high temperature. By using the apparatus I have invented the setting of the glue is continuously carried on while the apparatus is in operative condition. I can apply the necessary pressure continuously for the necessary time to accomplish the results desired.

Among the important features of my invention, therefore, are: first; a process of continuously producing plural layer structures, that is, without stopping the apparatus by which it is produced after it is started until it is desired to stop production; second; apparatus for applying the necessary high degree of temperature to set the glue; third; apparatus designed to continue the application of heat the necessary length of time to complete the "set" of the glue; and, fourth; apparatus for applying the necessary pressure.

These and further objects are accomplished and my process is carried out by the apparatus which is illustrated in the accompanying drawings, in which:

Figure 1 is a vertical sectional view illustrating apparatus for carrying out my process;

Figure 2 is a similar view showing a modified form of apparatus for carrying out my process;

Figure 3 is a vertical section of the pressing roll and steam plate, showing an endless belt applied to the steam plate;

Figure 4 is a vertical section showing a modified form of apparatus for carrying out my process; and Figure 5 is a similar view showing another modified form of apparatus for carrying out my process.

Thin veneer 1 wound on a drum 2 is fed over a support 3 and a supporting roller 4 until it comes in contact with a pressing roll 5 which may be heated by steam or in any other suitable way, as by a flame, hot fluid, or electricity. Paper, fabric, rubber, or other material 6 which it is desired to join to veneer is fed from a drum 7 over a sizing drum 8. This drum is properly moistened with glue 9, such as albumin glue or other glue requiring heat higher than ordinary room temperature to set it. Revolving in the glue receptacle 10 is a roller 11 suitable for spreading the glue on the sizing drum 8. Placed against the pressing roll 5 and in proper relation thereto is a hollow steam plate 12 which may be heated by steam or in any other suitable way, as by a flame, fluid, or electricity. The steam plate covers approximately half the pressing roll. To obtain a uniform pressure, the pressing roll may be covered with a padding 13 of any suitable material. If, however, the plies to be united are sufficiently soft and yielding, no padding of the pressing roll is necessary. Proper pressure is obtained by the use of adjustable springs 14.

Glue, such as albumin glue or other glues which require a high temperature to set, is used in my process with the apparatus disclosed, and a temperature not under 160° Fahrenheit is maintained from the time the plies are brought together until the finished product comes out from between the pressing roll and the steam plate and is wound on a drum 15 placed a suitable distance from the pressing roll and plate to allow the finished product to dry and complete the setting.

A temperature as high as 250° Fahrenheit obtained by high pressure steam may be used in carrying out my process. Generally speaking, the speed with which the plies are passed through the apparatus is increased as the temperature is increased above 160° Fahrenheit.

Motion is imparted to all of the moving parts by any of the usual means, such as by a motor.

Veneer in its green condition may be used just as it comes from the veneer cutting machine.

A multiplicity of duplicate pressing rolls and steam plates may be used to carry out my process.

A slightly different application of my process is disclosed in Figure 2, in which veneer is wound on the drum 16; paper, fibre, rubber, leather or similar material on the drum 17; and a glue-impregnated sheet on the drum 18. These three plies are carried directly to the heated pressing roll and steam plate where they are caused to adhere in the same manner as with the device illustrated in Figure 1. The finished product is then wound on a suitable drum 19. Either or all of the layers may be dried or moistened as desired, or veneer in the green condition may be used.

In Figure 3, an endless belt 20 of fabric or other suitable material extending the entire length of the steam plate and pressing roll is caused to move by the pressing roll or by rollers 21 between the pressing roll and the steam plate. This belt prevents the glazing or glossing of the veneer which sometimes results from sliding over the metal steam plate shown in Figures 1 and 2.

In Figure 4, a pressing roll 22, heated in the same way as the pressing roll shown in Figures 1, 2, and 3, has arranged around the greater part of its circumference a multiplicity of small rollers 23. Extending around these rollers 23 is an endless belt 24 which moves in the direction indicated.

Layers of material 25, such as have been indicated for use with the apparatus illustrated in Figures 1 and 2, with glue applied to one or more layers or with glue in the form of a dry layer, are fed between the pressing roll and the small rollers where the necessary heat and pressure are applied the requisite length of time to set the glue. The finished product 26 may be wound on suitable drums.

In Figure 5, apparatus similar to the apparatus illustrated in Figure 4 is enclosed in a compartment 27 having steam coils 28 therein to heat the air to the required temperature to set the glue. Air may be admitted by the inlet pipe 29 and exhausted by the outlet pipe 30. The layers of material 31 are fed to the pressing roll in the same way as to the apparatus disclosed in Figure 4. The finished material 32 may be wound on suitable drums.

I claim:—

1. An apparatus of the kind described comprising means to bring layers of material together including revolving drums from which said layers are fed, means to cause said layers to adhere including a revolving pressing roll having the surface thereof padded, a concave plate surrounding substantially half of said pressing roll, a belt passing around said concave plate and between said plate and said roll, means to heat the layers in excess of 160° Fahrenheit while passing between said roll and said plate, and a drum on which the finished product is wound.

2. An apparatus for manufacturing plural layer structures comprising means to bring together a layer of wood veneer and a layer of other material with a layer of albumin adhesive impregnated material between said layers, including revolving drums from which said layers are unwound, means to cause said layers to adhere including a steam heated pressing roll having the surface thereof padded, a concave heated steam plate, a moving belt extending around said plate and in direct contact with said roll, whereby the veneer layer is prevented from coming in contact with said steam plate and being glazed thereby, means to heat said roll and said plate to a sufficient temperature to set said adhesive, and means to regulate the pressure between said roll and said plate.

3. An apparatus of the kind described comprising means to bring layers of material together including revolving drums from which said layers are fed, means to cause said layers to adhere including a revolving pressing roll and a concave plate surrounding a part of said pressing roll between which said layers are passed, said roll having a layer of moisture absorbing material thereon, means to heat said layers, means to apply pressure to said layers, and a drum on which the finished product is wound.

4. An apparatus of the kind described comprising means to bring layers of material together including revolving drums from which said layers are fed, means to cause said layers to adhere including a revolving pressing roll and a concave plate surrounding a part of said pressing roll between which said layers are passed, said roll and said plate having a layer of moisture absorbing material thereon, means to heat said layers, means to apply pressure to said layers, and a drum on which the finished product is wound.

5. A process of manufacturing plural layer structures comprising bringing together plies to be united and an adhesive, and subjecting said plies and said adhesive to both heat and pressure at the same time, the application of heat and pressure being continuous from the time first applied until the conclusion of the application, and said plies and said adhesive being heated and pressed while in a curved position.

6. A continuous process of manufacturing plural layer structures comprising bringing together plies to be united and an adhesive, subjecting said plies and said adhesive to both heat and pressure at the same time, the application of heat and pressure being continuous from the time first applied until the conclusion of the application thereof, said plies and said adhesive being heated and pressed while in a curved position, said plies and said adhesive being in constant motion while both heat and pressure are applied.

7. A continuous process of manufacturing plural layer structures comprising bringing together plies to be united and an adhesive, subjecting said plies and said adhesive to both heat and pressure at the same time, the application of heat and pressure being continuous from the time first applied until the conclusion of the application thereof, said plies and said adhesive being heated and pressed while in a curved position, said plies and said adhesive being in constant motion while both heat and pressure are applied, and providing for the evaporation of moisture from the plies while heat and pressure are applied.

In testimony whereof I affix my signature.

ARMIN ELMENDORF.